United States Patent
Akhlaq et al.

(10) Patent No.: US 9,226,252 B2
(45) Date of Patent: Dec. 29, 2015

(54) RECURSIVE TIME SYNCHRONIZATION PROTOCOL METHOD FOR WIRELESS SENSOR NETWORKS

(71) Applicants: KING FAHD UNIVERSITY OF PETROLEUM AND MINERALS, Dhahran (SA); KING ABDULAZIZ CITY FOR SCIENCE AND TECHNOLOGY, Riyadh (SA)

(72) Inventors: Muhammad Akhlaq, Hafr Al-Batin (SA); Tarek R. Sheltami, Dhahran (SA)

(73) Assignees: KING FAHD UNIVERSITY OF PETROLEUM AND MINERALS, Dhahran (SA); KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 88 days.

(21) Appl. No.: 13/909,031

(22) Filed: Jun. 3, 2013

(65) Prior Publication Data
US 2014/0355628 A1 Dec. 4, 2014

(51) Int. Cl.
*H04W 56/00* (2009.01)

(52) U.S. Cl.
CPC .............. *H04W 56/001* (2013.01); *Y02B 60/50* (2013.01)

(58) Field of Classification Search
CPC ..... H04J 3/0685; H04W 80/00; H04W 80/02; H04W 84/18; H04L 7/00; H04L 7/0012; H04L 7/0016
USPC ..................................................... 370/3, 509
See application file for complete search history.

(56) References Cited

U.S. PATENT DOCUMENTS

| | | | |
|---|---|---|---|
| 5,257,404 A | 10/1993 | Goreham et al. | |
| 6,711,409 B1 * | 3/2004 | Zavgren et al. | 455/445 |
| 7,203,729 B2 * | 4/2007 | Chen et al. | 709/209 |
| 7,668,151 B2 | 2/2010 | Ryu et al. | |
| 7,817,616 B2 | 10/2010 | Park et al. | |
| 7,916,017 B2 * | 3/2011 | Youn et al. | 340/539.3 |
| 7,961,760 B2 | 6/2011 | Lu et al. | |
| 2007/0236359 A1 | 10/2007 | Wynans et al. | |
| 2010/0034191 A1 | 2/2010 | Schulz | |
| 2010/0153578 A1 * | 6/2010 | Van Gassel et al. | 709/231 |
| 2010/0260167 A1 | 10/2010 | Kim et al. | |
| 2011/0002251 A1 | 1/2011 | Shin et al. | |

OTHER PUBLICATIONS

Muhammad Akhlaq and Tarek R. Sheltami, "The Recursive Time Synchronization Protocol for Wireless Sensor Networks" 2012 IEEE Sensors Applications Symposium (SAS), Feb. 7-9, pp. 1-6.*
Muhammad Akhlaq and Tarek R. Sheltami, "The Recursive Time Synchronization Protocol for Wireless Sensor Networks", 2012 IEEE Sensors Applications Symposium (SAS), Feb. 7-9, 2012, pp. 1-6.

* cited by examiner

*Primary Examiner* — David Oveissi
(74) *Attorney, Agent, or Firm* — Richard C. Litman (57) ABSTRACT

The recursive time synchronization protocol method for wireless sensor networks provides a modified and extended RTSP method to make it work with clustered networks. In case of non-clustered or flat network, each node is assumed to be a clusterhead in order to run the RTSP method correctly. The RTSP method involves the election of a reference node, and compensation for offset and drift. Simulation results show that the extended RTSP method further improves the accuracy and energy consumption, i.e., it can provide an average accuracy of 0.23 μs in a large multi-hop clustered network while using only ½th of the energy consumed by FTSP in the long run.

9 Claims, 9 Drawing Sheets

| | Algorithm 1: RTSP |
|---|---|
| 1. | Check if new RTSP msg is received (or overheard); |
| 2. | // *on receiving a new message, do the following* |
| 3. | If a new authenticated msg is received then |
| 4. |    If msg→msgType == "ERN" then |
| 5. |       T2 = timestamp after SFD byte received; |
| 6. |       If msg→refNodeID<0 AND myRef!=Null then |
| 7. |          // an enquiry; reply if reference ID known |
| 8. |          T3 = timestamp after SFD byte sent; |
| 9. |          RTSP("ERN", msg→msgID, myID, myID, |
| 10. |             msg→imSrcID, myRef, msg→T1, |
| 11. |             T2, T3, Tr); |
| 12. |       Else if (msg→refNodeID >=0 AND |
| 13. |            myRef is empty) OR |
| 14. |            myRef > msg→refNodeID then |
| 15. |          //reference ID unknown/expired; accept new |
| 16. |          myRef = msg→refNodeID; |
| 17. |          RTSP("ERN",msg→msgID, msg→originID, |
| 18. |             myID,*, msg→refNodeID,0,0,0, Tr); |
| 19. |       Else if myID < msg→refNodeID AND I'm a |
| 20. |          clusterhead AND myEnergy>low then |
| 21. |          //smaller ID & fair energy; enter into contest |
| 22. |          myRef = myID; |
| 23. |          RTSP("ERN", msgID, myID, myID, *, |
| 24. |             myID, 0, 0, 0, Tr); |
| 25. |       Else if myRef == msg→refNodeID AND |
| 26. |          I'm a gateway or a clusterhead AND |
| 27. |          myID != msg→originID AND |
| 28. |          msg→msgID is new then |
| 29. |          // new msg from reference node; rebroadcast |
| 30. |          RTSP("ERN",msg→msgID, msg→originID, |
| 31. |             myID,*,msg→refNodeID, 0,0,0,Tr); |
| 32. |    End if |
| 33. |    Else if msg→msgType == "REQ" then |
| 34. |       T2 = timestamp after SFD byte received; |
| 35. |       If myID==refNodeID OR I'm a synchronized |
| 36. |          gateway or clusterhead then |
| 37. |          // reply as reference or a synchronized node |
| 38. |          T3 = timestamp after SFD byte sent; |
| 39. |          Tr = T3; |
| 40. |          RTSP("REP",msg→msgID, msg→originID, |
| 41. |             myID, msg→imSrcID, myID, |
| 42. |             msg→T1, T2, T3, Tr); |
| 43. |       Else if I'm a gateway or clusterhead then |
| 44. |          //save T1, T2, source, and do a recursive call |
| 45. |          T1old = msg→T1; |
| 46. |          T2old = T2; |
| 47. |          myClient = msg→imSrcID; |
| 48. |          T1 = timestamp after SFD byte sent; |
| 49. |          RTSP("REQ",msg→msgID, msg→originID, |

```
50.            myID, myRef, myRef, T1, 0, 0, Tr);
51.        End if
52.    Else if msg→msgType == "REP" then
53.        // calculate d, adjust & record timestamp
54.        T4 = timestamp after SFD byte received;
55.        d = ((msg→T2−msg→T1)+(T4−msg→T3))/2 ;
56.        Tr = msg→Tr + d;
57.        Record timestamps global=Tr & local=T4;
58.        If myID != msg→originID AND
59.                myClient not empty then
60.            // recover T1 & T2; and forward the msg
61.            T1 = T1old;  T2 = T2old;
62.            T3 = timestamp after SFD byte sent
63.            Tr = Tr+(T3−T4); //+ elapsed time since T4
64.            RTSP("REP",msg→msgID, msg→originID,
65.                myID, myClient, msg→refNodeID,
66.                msg→T1, T2, T3, Tr);
67.            Clear the variable myClient;
68.        End if
69.    End if
70. End if
71. //ask the id of reference node if not known already
72. If myRef == Null AND I'm a clusterhead then
73.     RTSP("ERN",msgID,myID,myID,*,-1,T1,0,0, Tr);
74. Else if myRef == Null AND I'm not clusterhead then
75.     RTSP("ERN", msgID, myID, myID, myCH,
76.         -1, T1, 0, 0, Tr);
77. End if
78. // if no msg received for T, start contest for reference
79. If no ERN msg received for T AND I'm clusterhead
80.         AND myID!=myRef AND myEnergy>low then
81.     // contest for reference node by broadcasting ERN
82.     myRef = myID;
83.     RTSP("ERN", msgID, myID, myID, *, myID, 0,
84.         0, 0, Tr);
85. End if
86. //a reference node broadcasts every after T period
87. If myID == myRef AND didn't broadcast for T AND
88.         myEnergy > low then
89.     // an active reference node rebroadcasts after T
90.     RTSP("ERN", msgID, myID, myID, *, myID, 0,
91.         0, 0, Tr);
92. End if
93. // if out of synchronization, send sync.request
94. If ((new REP msg overheard OR ERN msg received)
95.         AND myRef == msg→refNodeID AND
96.         local time much different than msg→Tr) OR
97.         skew is much lesser or greater than 1 then
98.     // node is out of synchronization; so send request
```

*Fig. 6B*

```
99.     RTSP("REQ", msgID, myID, myID, myRef,
100.            myRef, T1, 0, 0, Tr);
101. End if
102. //estimate offset & drift using two data points
103. If two data points, with one new, are available then
104.     Calculate α and β using the last two data points;
105.     Update the local clock to become synchronized;
106. End if
```

RECURSIVE TIME SYNCHRONIZATION PROTOCOL METHOD FOR WIRELESS SENSOR NETWORKS

BACKGROUND OF THE INVENTION

1. Field of the Invention

The present invention relates to wireless sensor networks, and particularly to a recursive time synchronization protocol (RTSP) method for wireless sensor networks (WSNs) that efficiently synchronizes the nodes of a wireless sensor network.

2. Description of the Related Art

Wireless Sensor Networks (WSNs) require accurate time synchronization (usually less than one microsecond) for many reasons, such as precise time-stamping of messages, in-network signal processing, time-based localization, TDMA-based medium access, cooperative communication, coordinated actuation, and energy-efficient duty cycling of sensor nodes. There are several ways to achieve synchronization, which include ordering of events, local synchronization, global synchronization, etc. However, many applications need global time synchronization, which requires all nodes to be synchronized with one global clock.

As WSNs are commonly deployed for monitoring remote and hazardous environments, it is not feasible to recharge or replace the battery of sensor nodes. Therefore, sensor nodes should use their energy very efficiently, even when a power harvesting technique is used with a battery of limited capacity. It is important to note that most of the sensors' energy is consumed by message transmission and idle listening, and that clock synchronization algorithms work by exchanging messages among the nodes. Therefore, the lifetime of WSNs can be significantly prolonged by using an energy-efficient protocol for clock synchronization. However, the total energy consumed by a time-synchronization protocol depends on the re-synchronization interval, T, and the ratio of time-synchronization messages to the total number of messages in the network that is determined by the application.

The issue of clock synchronization has been investigated extensively, and several methods or protocols have been proposed for global time synchronization, such as GPS-based clock synchronization, Network Time Protocol (NTP), Precision Time Protocol (PTP), Reference Broadcast Synchronization (RBS), Timing-sync Protocol for Sensor Networks (TPSN), and Flooding Time Synchronization Protocol (FTSP).

The GPS-based clock-synchronization can provide an accuracy of 1 µs or better, but it is costly, energy-inefficient, and infeasible in obstructed environments. The NTP is commonly used in traditional computer networks, including the Internet, but it is not suitable for WSNs because of its very low accuracy (i.e., in the order of milliseconds only), high complexity and energy inefficiency. The PTP, defined by the IEEE 1588 standard, can achieve clock accuracy in the sub-microsecond range for networked measurement and control systems, but it is suitable only for a hierarchical master-slave architecture. The RBS uses receiver-receiver synchronization to produce an average accuracy of 29.1 us for a single hop network, but this accuracy is not sufficient for WSNs which require an accuracy of 1 µs or better. The TPSN uses sender-receiver synchronization and MAC-layer time-stamping of messages at the sender side to provide an average accuracy of 16.9 µs for a single hop network and less than 20 µs for multi-hop network, but it is still not sufficient for WSNs.

The Flooding Time Synchronization Protocol (FTSP) is the most commonly used protocol for clock synchronization in WSNs. It broadcasts messages with timing information from a single sender to several receivers without any exchange among themselves, and strives to tackle the flaws of TPSN. It dynamically elects a reference node, which regularly floods its current timestamp into the network, creating an ad-hoc tree structure of the network instead of a fixed spanning tree. The MAC-layer time-stamping at both sender and receiver sides eliminates all kind of random delays, except propagation delay. The timestamps are made at the end of each byte after the SFD (Start of Frame Delimiter) or SYNC byte, and are normalized, averaged, and error-corrected, and then the final timestamp is embedded into the message. A node waits for sufficient data points that are pairs of global and local timestamps, and then estimates the offset and skew using a least square linear regression (LSLR). Any node that is fully synchronized with the reference node begins flooding its own estimation of the global clock. In this way, the FTSP provides an accuracy of 1.48 µs for the single hop case, and about 0.5 µs per hop in a multi-hop network.

There have been many efforts to improve the FTSP in terms of accuracy, efficiency, energy consumption, etc. Exemplary related art includes improved accuracy and power consumption in a single hop network using a different method of time-stamping that is based on the Start of Frame Delimiter (SFD) byte. In the SFD-based time-stamping, messages are time-stamped using the time at which a radio chip generates an interrupt for the microcontroller after the SFD byte has been sent or received. Similarly, other related art obtains an accuracy of 0.4 us in a single hop network by using SFD-based time-stamping along with a Kalman-filter for skew estimation. Although the accuracy of FTSP and its improved versions is sufficiently good, the energy consumption is very high, and the distant nodes are poorly synchronized.

The present inventors proposed a Recursive Time Synchronization Protocol (RTSP) presented at the IEEE SAS2012 in Brescia, Italy, described in Muhammad Akhlaq and Tarek R. Sheltami, "The Recursive Time Synchronization Protocol for Wireless Sensor Networks", 2012 IEEE Sensors Applications Symposium (SAS), Feb. 7-9, 2012, pages 1-6" which is incorporated by reference in its entirety herein. The RTSP provides an average accuracy of 0.3 µs per-hop in a large multi-hop flat network (i.e., without clustering), while using only ⅕th of the energy consumed by FTSP in the long run. However, the related art RTSP does not address the fact that WSNs are usually clustered and hierarchical.

Thus, a recursive time synchronization protocol method for wireless sensor networks solving the aforementioned problems is desired.

SUMMARY OF THE INVENTION

The recursive time synchronization protocol (RTSP) method for wireless sensor networks provides a modified and extended RTSP method to make it work with clustered networks. In case of a non-clustered or flat network, each node is assumed to be a clusterhead in order to run the RTSP method correctly. The present RTSP method involves the election of a reference node, and compensation for offset and drift.

Simulation results show that the present extended RTSP method further improves accuracy and energy consumption, i.e., it can provide an average accuracy of 0.23 µs in a large multi-hop clustered network, while using only ⅐th of the energy consumed by FTSP in the long run.

These and other features of the present invention will become readily apparent upon further review of the following specification and drawings.

BRIEF DESCRIPTION OF THE DRAWINGS

FIGS. 6A, 6B, and 6C are a listing of pseudocode representing the RTSP algorithm of the recursive time synchronization protocol (RTSP) method for wireless sensor networks according to the present invention.

Similar reference characters denote corresponding features consistently throughout the attached drawings.

DETAILED DESCRIPTION OF THE PREFERRED EMBODIMENTS

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

The recursive time synchronization protocol method for wireless sensor networks provides a modified and extended RTSP method to make it work with clustered networks. In case of a non-clustered or flat network, each node is assumed to be a clusterhead in order to run the RTSP method correctly. The present RTSP method involves the election of a reference node, and compensation for offset and drift.

The system model includes a clock model with some assumptions. Each sensor node has a hardware clock including timer circuitry, which is usually based on a quartz crystal oscillator, and hence unstable and error-prone. The hardware clock can be translated into a logical clock, which is used for time keeping.

The hardware clock with instantaneous oscillator frequency $f_i(t)$ at an ideal time t, is defined in equation (1), where $f_0$ is the ideal frequency, $\Delta f$ is the frequency offset, $d_f$ is the drift in frequency, and $r_f(t)$ is the random error process:

$$f_i(t) = f_0 + \Delta f + d_f t + r_f(t) \tag{1}$$

Assuming t=0 as the initial reference time, the related logical clock reads time $C_i(t)$ at ideal time t, defined as:

$$C_i(t) = C_i(0) + \frac{1}{f_0} \int_0^t f_i(t) dt \tag{2}$$

An expression is obtained for the time $C_i(t)$ of clock i at a given ideal time t by combining (1) and (2), as follows:

$$C_i(t) = C_i(0) + \frac{1}{f_0} \int_0^t (f_0 + \Delta f + d_f t + r_f(t)) dt \tag{3}$$

To derive a simple linear model for a non-ideal clock, assume that there is no frequency drift ($d_f$) and that random clock error ($r_f(t)$) is a zero mean. Therefore, after elimination of the last two terms in equation (3) and further simplification, we obtain $$C_i(t) = C_i(0) + \left(1 + \frac{\Delta f}{f_0}\right)t,$$

which can be written in very simple form as equation (4), where $\alpha_i$ is the clock offset (i.e., the deviation from ideal time) at the reference time t=0 and $\beta_i$ is the clock skew (i.e., the frequency of a clock):

$$C_i(t) = \alpha_i + \beta_i t \tag{4}$$

Clocks are usually specified with a maximum drift rate $\rho$ (i.e., the rate of change of frequency with respect to the ideal clock), such that $1-\rho \le \beta_i - 1 + \rho$. That is, the clocks of any two perfectly synchronized nodes may drift away from each other at a rate at most $2\rho$. Therefore, in order to keep their relative offset within $\delta$ seconds all of the time, they need to be resynchronized within $\delta/2\rho$ seconds, i.e., re-synchronization interval $T \le \delta/2\rho$. However, frequent re-synchronizations are not feasible due to inefficiency, cost, etc. Therefore, it is essential to estimate the drift or skew in order to keep the sensor clocks synchronized without any need for frequent re-synchronizations.

The following assumptions are made: sensor nodes are uniquely identified by their numeric IDs from 0 to n−1; time-stamping of messages at the MAC-layer is possible for each node; neighboring nodes can communicate over an unreliable and error-corrected wireless channel; broadcasting of messages is possible in the network; skew and connectivity don't change during the short interval between a synchronization request and reply; propagation delay in one direction is exactly equal to the other, and a simple linear relationship exists between the clocks of two sensor nodes in a short duration.

Figure 1:
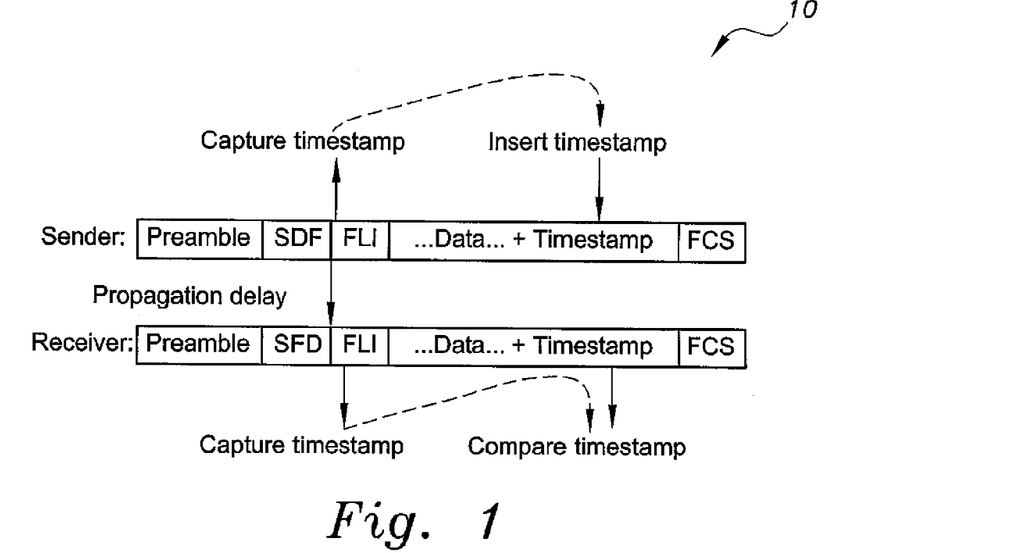
FIG. 1 is a diagram showing the MAC (media access control) frame and time-stamping used by the recursive time synchronization protocol (RTSP) method for wireless sensor networks according to the present invention.

MAC-layer time-stamping of messages, both at sender and receiver sides, is very useful for time synchronization in WSNs. The standard IEEE 802.15.4 compliant frame consists of 4 bytes of preamble, 1 byte of SFD (Start of Frame Delimiter), 1 byte of FLT (Frame Length Indicator), data payload of 125 bytes maximum and 2 bytes of FCS (Frame Check Sequence). FIG. 1 shows that the RTSP algorithm timestamps messages 10 when the radio chip generates an interrupt for the microcontroller after the SYNC/SFD byte has been sent or received. Ignoring the propagation delay, this interrupt occurs almost simultaneously both at the sender and receiver chips with a difference of 3 µs. Therefore, the timestamp at the sender side is incremented by 3 µs.

This time-stamping approach is simpler, faster and more accurate than that of FTSP, in which timestamps are made at the end of each byte after the SFD byte, normalized, averaged, and error-corrected, and then the final timestamp is embedded into the message. It is important to note that this approach is also unable to compensate for propagation delay. Therefore, we introduce a mechanism for finding and compensating for propagation delays in order to achieve higher accuracy of time synchronization in the RTSP algorithm.

The RTSP algorithm achieves time synchronization by exchanging messages among nodes. There are three types of messages, including ERN (enquiry/election of the reference node), REQ (request for time synchronization), and REP (reply for time synchronization). The structure of an RTSP message is shown in Table 1. Note that an RTSP-ERN message with a negative value for the refNodeID field is treated as an enquiry, while a non-negative value is treated as an announcement or contest. A node requests timing information by sending an RTSP-REQ message to the reference node, while the reference node or any synchronized node on the request-path replies with an RTSP-REP message. The fields T1, T2, T3 and Tr are used for timestamps after the SFD byte has been sent, received or forwarded.

TABLE 1

STRUCTURE OF THE RTSP MESSAGES

| Field | Description |
| --- | --- |
| msgType | Type of the message: ERN (enquiry/election of the reference node), REQ (request for time synchronization), and REP (reply for time synchronization). |
| msgID | ID of the message. |
| originID | ID of the node that originated the message. |
| imSrcID | ID of immediate source node that forwarded the message. |
| imDestID | ID of immediate destination for message forwarding. |
| refNodeID | ID of the reference node known (−1 for ERN enquiry). |
| T1 | Local time when the message was sent or forwarded. |
| T2 | Local time when the message was received. |
| T3 | Local time when reply was sent or forwarded. |
| Tr | Reference time when the reply was sent or forwarded. |

We use 0 for Null value and * for broadcast address, and RTSP-REQ msg takes Null values for T2, T3 and Tr.

The RTSP algorithm does not require any tree-like structure; it works with any network topology, flat and clustered. A time synchronization request can be initiated by any node in the network, which is recursively forwarded to the reference node. The reference node, or any synchronized node on the request-path, replies with timing information that is sent back to the requesting node through the same path. It is important to note that the propagation delay is also compensated for at each hop before forwarding the reply.

Figure 2:
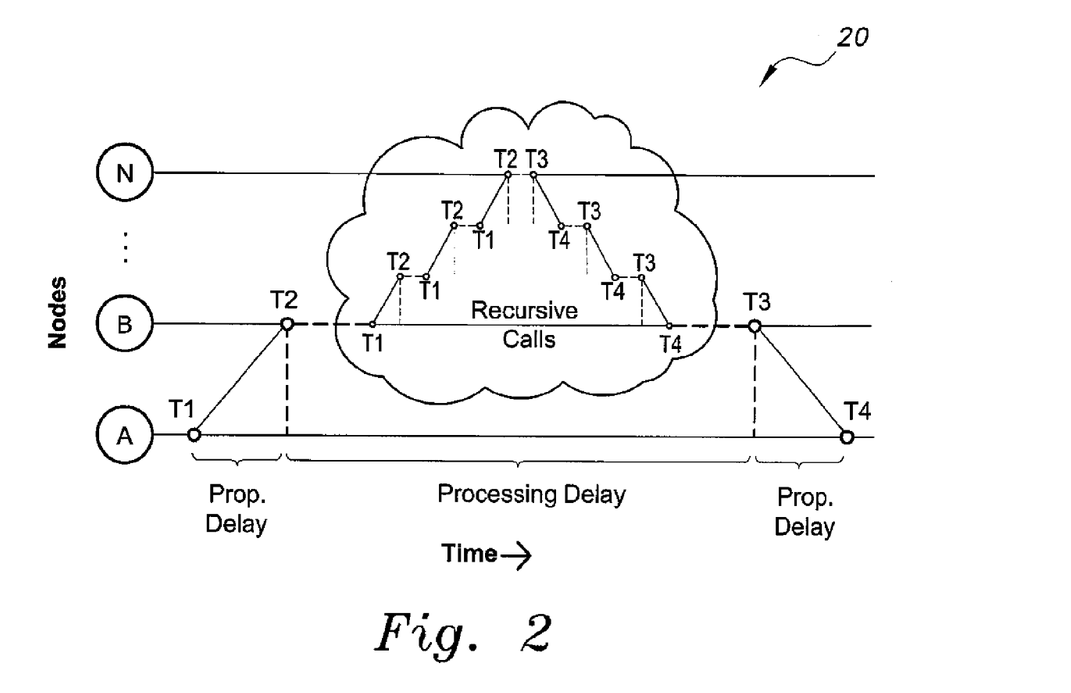
FIG. 2 is a diagram showing the request and reply mechanism of the recursive time synchronization protocol (RTSP) method for wireless sensor networks according to the present invention.

FIG. 2 explains the request-and-reply mechanism 20 in RTSP. The node A in a multi-hop network sends a request at T1 to the reference node via another node B that receives it at time T2. The node B, if not synchronized, forwards this request to another node in a recursive manner until it reaches the reference node or a fully synchronized node N, which replies with the timing information that is forwarded to node B through the same path. The node B at time T3 forwards this reply to node A, which receives it at time T4. It has already been proven that the performance of TPSN is insensitive to any variations in processing delay, i.e., the interval between T2 and T3 does not affect the accuracy of time synchronization. This gives us an opportunity to make recursive calls during the interval between T2 and T3 in the RTSP algorithm without losing performance.

Moreover, the nodes closer to the reference node are expected to do the following actions before the distant nodes: (1) receive announcements about the newly elected reference node, (2) initiate the time synchronization request on knowing the ID of the reference node, and (3) become synchronized with the reference node. As the closer nodes are expected to become synchronized before the distant nodes, and since any synchronized node on the request-path can reply, very few time synchronization requests are forwarded all the way to the reference node.

Figure 3A:
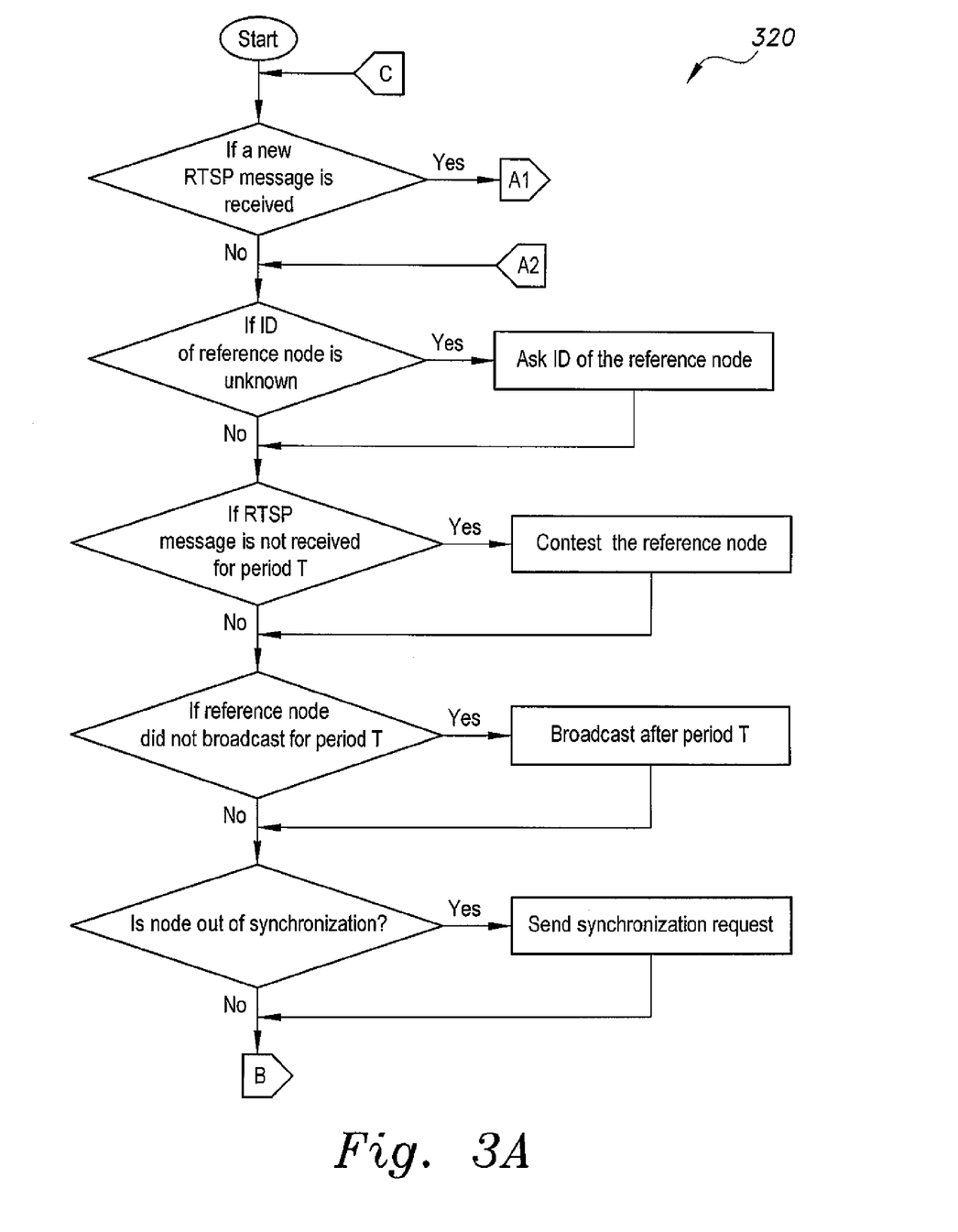
FIGS. 3A and 3B are a flowchart of the recursive time synchronization protocol (RTSP) method for wireless sensor networks according to the present invention.
Figure 3B:
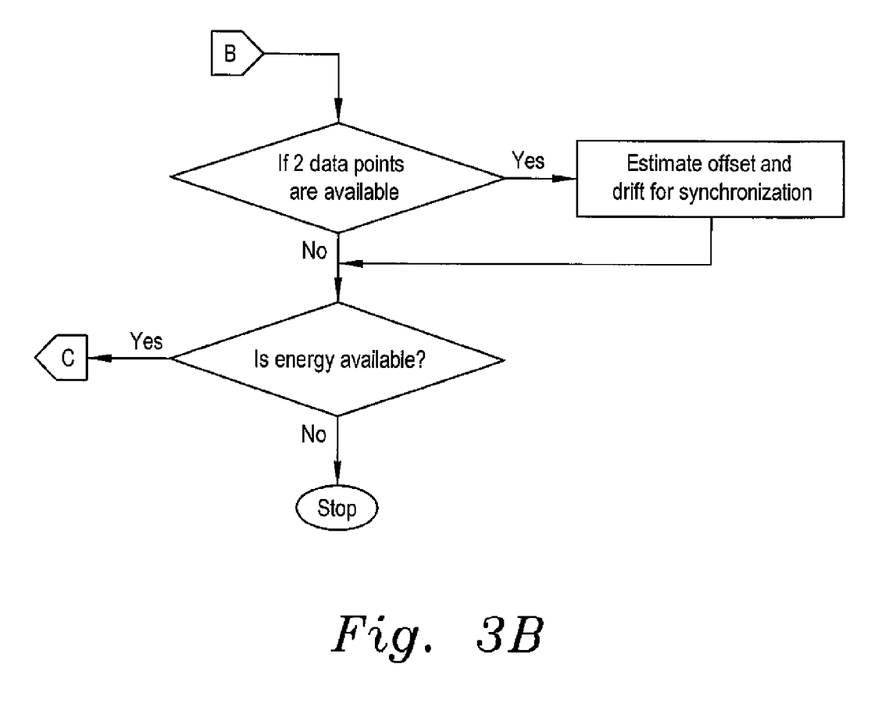
Figure 4A:
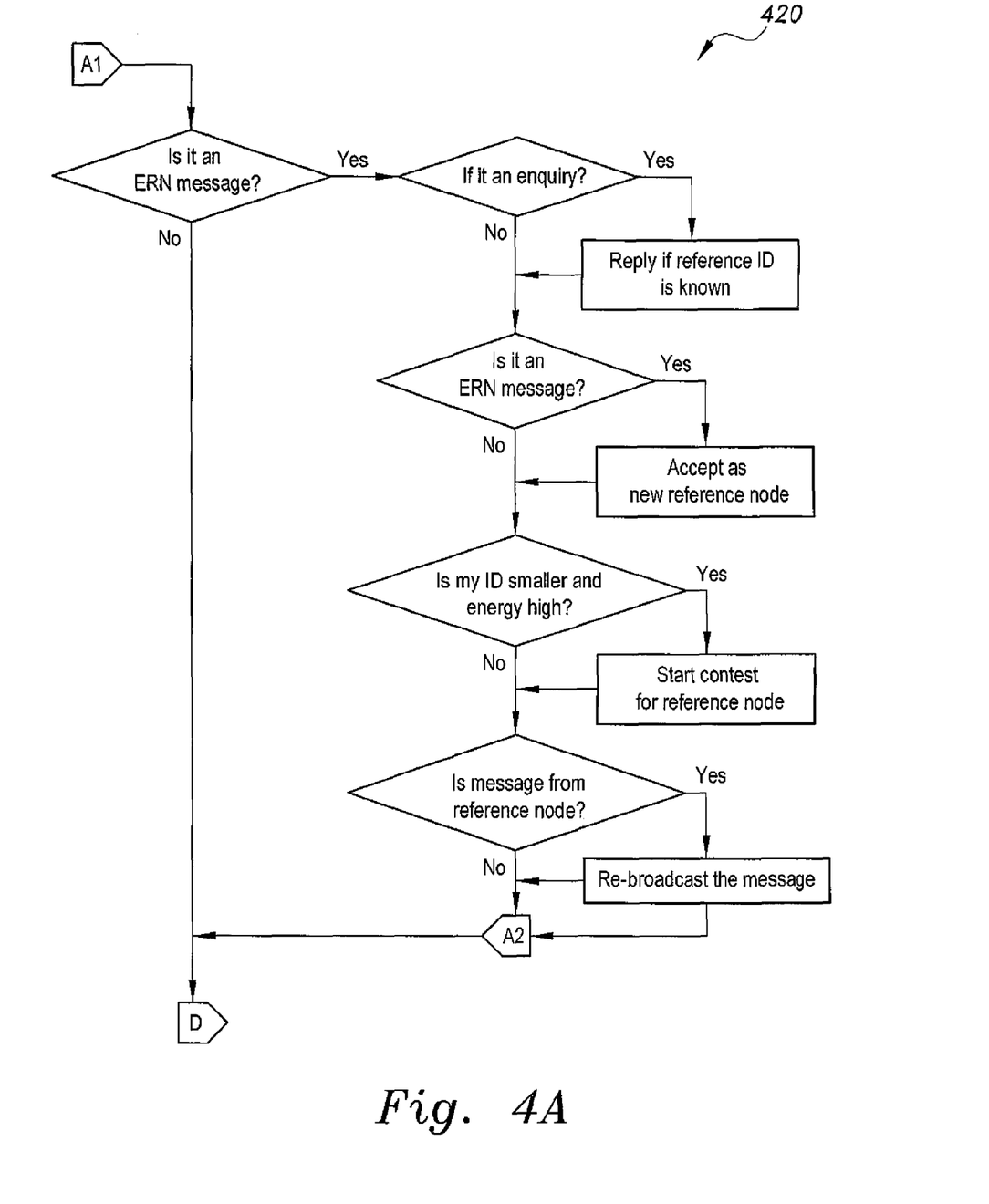
FIGS. 4A and 4B are a flowchart detailing segment A processing of the recursive time synchronization protocol (RTSP) method for wireless sensor networks according to the present invention.
Figure 4B:
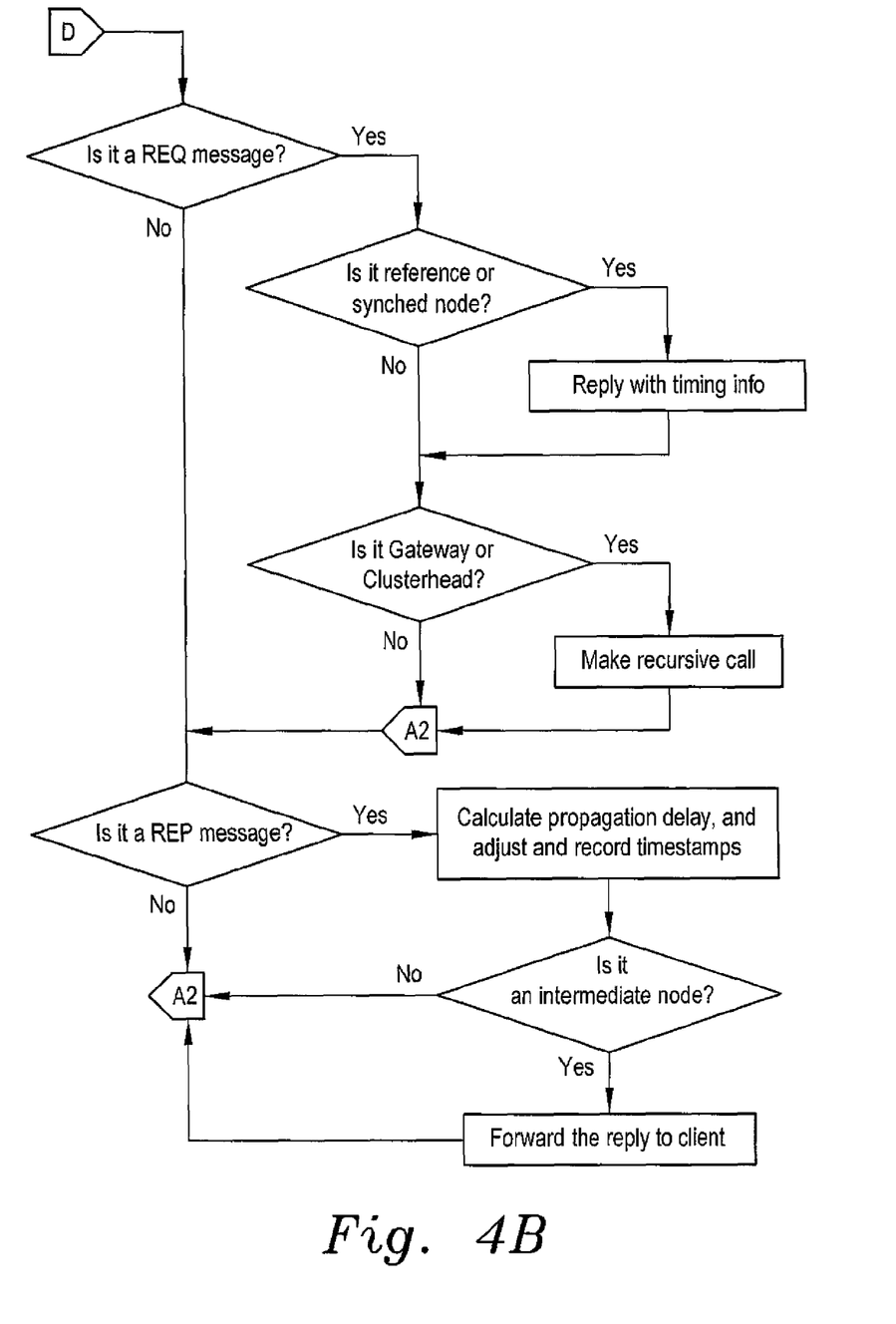

After a WSN boots up, the sensor nodes broadcast an RTSP-ERN enquiry message to ask their neighbours about the identification of the reference node, wait for the period T or until a reply is received, and runs the RTSP algorithm that takes care of the dynamic election of a single reference node with the smallest ID and compensation of the offset and drift. This process is outlined in the Algorithm 1: RTSP, and flow-charted as 320 in FIGS. 3A-3B and 420 in FIGS. 4A-4B.

Each node maintains a few variables, including myRef for ID of the reference node, and myClient for IDs of the nodes sending time synchronization requests through it.

In case the network is a non-clustered or flat network, each node is assumed to be a clusterhead in order to the run RTSP algorithm.

With respect to dynamic election of a single reference node, after start up, a sensor node waits for a short time, and then sends an RTSP-ERN message containing '−1' value for the refNodeID field in order to ask the neighboring nodes for ID of the reference node. It is important to note that a clusterhead broadcasts the inquiry message, but a non-clusterhead sends the inquiry message to its own clusterhead. The enquirer node waits for the duration T or until a reply is received. Then, if it does not receive any reply, it enters into the contest for a new reference node by broadcasting an RTSP-ERN message, which is done by putting its own identification in the refNodeID field. A node that is not a clusterhead, or that is low in energy, cannot take part in the contest for reference node. However, if it receives a reply, it saves the identification of the reference node in a local variable called myRef, and then broadcasts the RTSP-ERN message. If a new RTSP-ERN message is received and authenticated, it checks the value of the refNodeID field.

If the refNodeID field contains any negative value, the message is treated as an enquiry. If a node knows the identification of the reference node, it replies directly to the enquirer.

However, if the refNodeID field contains any non-negative value, the message is treated as an announcement or contest, and is flooded. If the receiving node does not know the identification of the reference node, or if it knows some identification that is greater than refNodeID, it learns the identification of a new reference node by updating the myRef variable, and then rebroadcasts the message.

If the ID of receiving node is smaller than the current reference node and the receiving node is a clusterhead with sufficient energy, it contests for the reference node by broadcasting an RTSP-ERN message.

If a clusterhead or a gateway already knows the same ID of the reference node, it just rebroadcasts the message.

The elected reference node takes responsibility of broadcasting the timing information periodically. However, the frequency of broadcasting is much lower, i.e., 1/10th of the FTPS because RTSP does not rely on this broadcast for the compensation of skew and offset. Instead, the RTSP algorithm uses this broadcasting mainly for announcing the identification of the reference node. Any node that receives a new RTSP-ERN message from the reference node accepts it, and then rebroadcasts to its neighbors. However, a duplicate message is ignored or rejected by the receivers.

It is possible that more than one node declares itself as the reference node simultaneously. To avoid any conflict, a reference node retreats to an ordinary node on receiving an RTSP-ERN message from another reference node with a smaller identification.

Figure 6C:
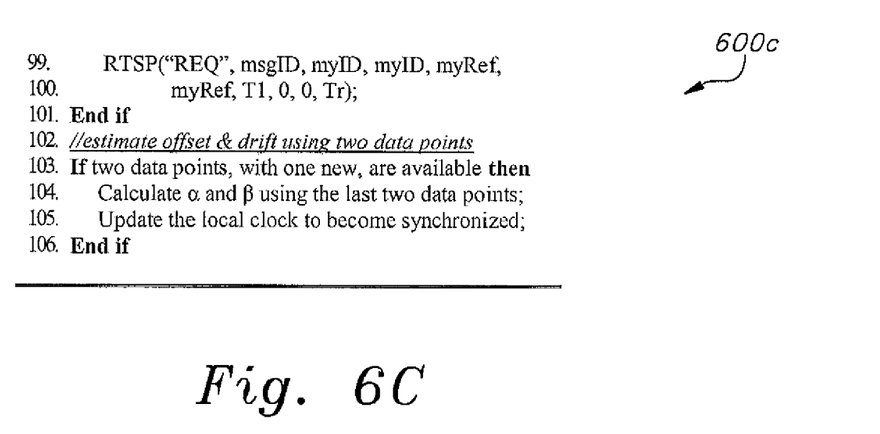

Although an RTSP-ERN message is mainly used to elect and announce the reference node in a network, it is also used to determine if a node is losing its accuracy of time synchronization and should request timing information using the RTSP algorithm. See FIGS. 6A-6C, code blocks 600a-600c, respectively, for details of algorithm 1, See FIGS. 3A-3B and 4A-4B for details of the overall RTSP method.

In order to compensate for offset & drift, and to synchronize all the nodes on the request-path to the reference node, a node checks the type of newly received RTSP message.

If an RTSP-REQ message is received, it notes the receive time T2. If it is a reference node or a synchronized clusterhead or gateway node, it replies with an RTSP-REP message containing timestamps T1, T2, T3 and Tr, along with other information. However, an unsynchronized intermediate node recursively forwards the request to the reference node after saving the ID of its client in myClient, and the values of T1 and T2 in T1 old and T2old, respectively. However, if an RTSP-REP message is received, it calculates the value of propagation delay by equation (5):

$$d = \frac{(T2 - T1) + (T4 - T3)}{2}. \quad (5)$$

Then, it finds the new value of Tr by adding d to the received value of Tr as given by equation (6):

$$Tr=Tr+d. \quad (6)$$

Then it records the global and local timestamps, where global=Tr and local=T4. Moreover, if the node is an intermediate node, it retrieves the values of T1 and T2, calculates the value of Tr by adding to it the elapsed time since T4 using equation (7), and then forwards the reply to its client node, if any.

$$Tr=Tr+(T3-T4). \quad (7)$$

Figure 5:
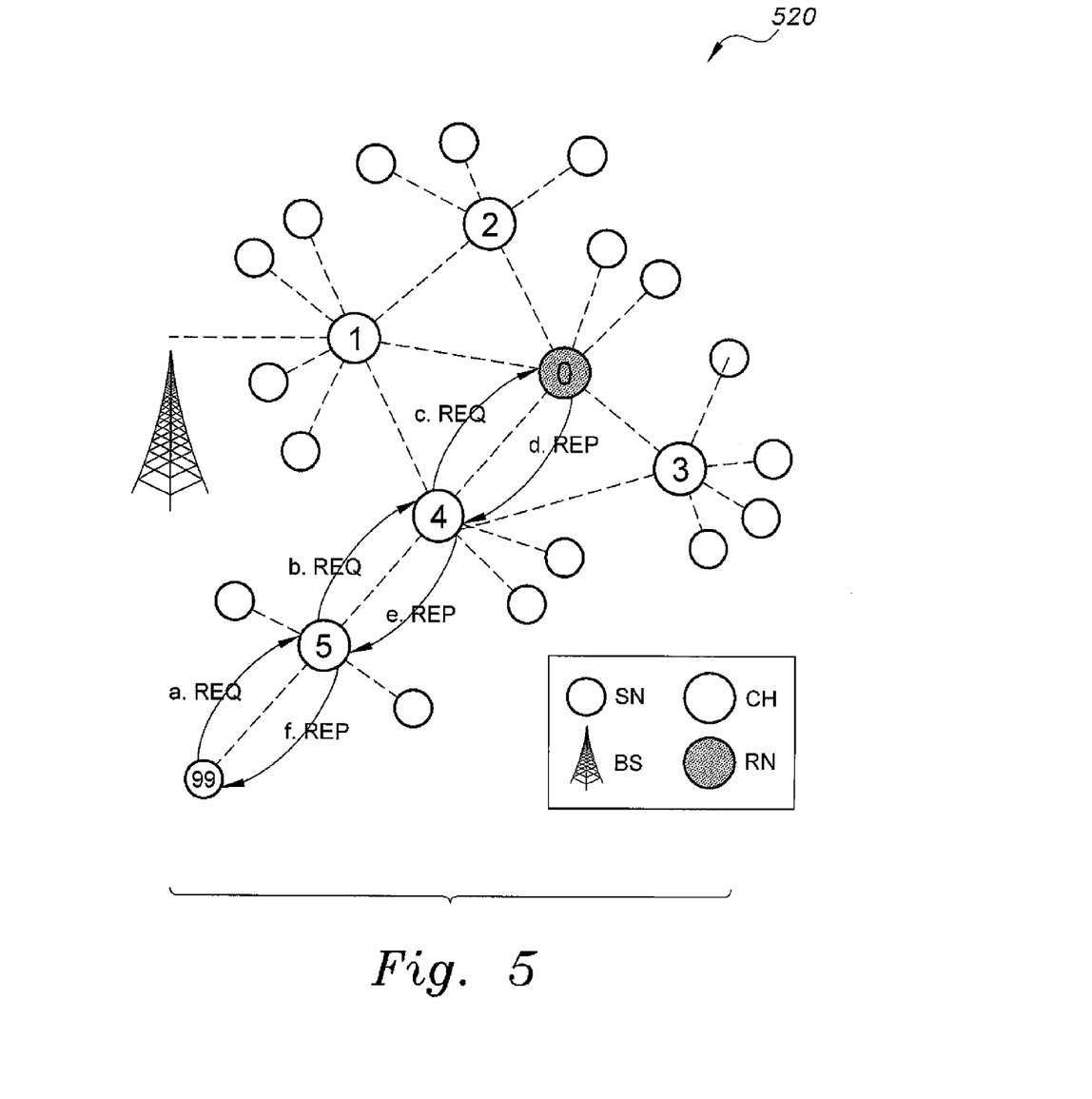
FIG. 5 is a diagram showing an exemplary request and reply mechanism in RTSP algorithm of the recursive time synchronization protocol (RTSP) method for wireless sensor networks according to the present invention.

FIG. 5 explains the request-and-reply mechanism of the RTSP algorithm with the help of an example of a clustered network 520. As shown in FIG. 5, node 99 initiates an RTSP-REQ at its local time T1, which is received by an intermediate node 5 at its local time T2. Node 5 stores the identification of node 99 in myClient, values of T1 and T2 in T1 old and T2old, respectively, and then forwards this request at its local time T1 to node 4, which recursively forwards it to the reference node 0. On receiving the request at its local time T2, the reference node 0 processes the request and sends back an RTSP-REP message at its local time T3. When node 4 receives the RTSP-REP reply at time T4, it performs the following six actions: (1) calculates the value of d; (2) adjusts the timestamps by adding d to Tr; (3) records the global and local timestamps; (4) retrieves the values of T1 and T2; (5) calculates the value of the new Tr by adding to it the elapsed time since T4; and (6) forwards the reply to node 5 at its local time T3. Node 5 also performs the same six actions, and then recursively forwards the reply to node 99. Similarly, node 99 performs the first three actions only, since it is not an intermediate node. Note that a reply follows exactly the same path as a request, but a new request/reply message may follow a different path from the previous message.

With respect to the adaptive resynchronization interval, a simple linear model for a clock, as given in equation (4), is not reasonable for long time intervals because of the drastic changes in clock drift due to any sudden change in the environmental temperature, humidity, etc. That is why clock drifts are repeatedly reassessed by re-synchronising the nodes periodically at a static interval. However, a static period is not feasible for dynamic environments. Therefore, we use an adaptive re-synchronization interval in the RTSP algorithm, which allows each individual node to decide if and when to initiate a time synchronization request based on either the value of skew or the deviation of local time from global time, as follows.

A node is considered to be perfectly synchronized when the current value of skew or drift is 1. Therefore, the value of skew can tell a node if it should initiate a time synchronization request or not. Accordingly, if the current value of skew is much less than or greater than 1, the node will request timing information by sending an RTSP-REQ message to the reference node. Otherwise, it will not request any update.

When local time is different from global, the following procedure applies. Although an overheard message is not yet compensated for offset, skew, or propagation delay, it can provide a rough idea of the global time. On overhearing an RTSP-REP message, a node can check if its local time is almost the same as the global timestamp in the Tr field. If the two times are much different, depending on the required accuracy, the node will initiate a time synchronization request. Otherwise, it will not request any update.

Such an adaptive re-synchronization interval helps to reduce the overhead of unnecessary time synchronization requests in the long run. It also provides for long-term synchronization in a self-configuring way. Besides this, the RTSP algorithm (Algorithm 1) performs a few other functions, which include restarting the process for election of the reference node on detecting a failure, broadcasting the RTSP-ERN messages periodically by an active reference node, and calculating the values of $\alpha$ and $\beta$ for updating the local clock.

Aggregation of the Synchronization Requests is handled as follows. In order to further reduce the number of time synchronization requests, and hence energy-consumption, the idea of request aggregation is supported in the RTSP algorithm. Consider the example in FIG. 5, and assume that another node under clusterhead 5 also initiates an RTSP-REQ message soon after node 99. The intermediate node (i.e., node 5) forwards only the first request to the reference node, waits for a reply, and then forwards this reply to all clients. In order to aggregate synchronization requests, node 5 temporarily saves information on msgID, myClient, T1, and T2 for both requests. It then forwards only one request to node 4. On receiving a reply, it uses the saved information for forwarding the reply to both requesters.

With respect to security, WSNs face many security challenges due to their environment and constraints, which include vulnerability to physical capture, the use of an insecure and unreliable wireless channel, and the availability of limited resources, such as computing, memory and energy. Moreover, the traditional protocols for time synchronization in WSNs do not consider security, and hence are prone to several kind of security attacks. Although security is not the prime objective of RTSP, it provides some basic level of protection against attacks on time synchronization in which a single compromised node may propagate incorrect timing information through the network. Simple techniques, such as redundancy, authentication, and refusal to forward corrupt synchronization information are used to tackle attacks on time synchronization.

With respect to redundancy, the RTSP algorithm provides some level of redundancy to avoid dependence on just one neighbor. For example, instead of receiving timing information always from the parent node, as in FTSP, each new request/reply message in RTSP may follow a different path. Also, a node may receive broadcasts by the reference node via a different neighbor at a different time. This provides redundancy for a basic level of security.

Regarding authentication, a node that wants to join the network is authenticated, first, by using any lightweight authentication protocol. Moreover, the RTSP algorithm is run only when a message is received from an authenticated node.

With respect to discarding the corrupt information, each RTSP message carries the current or real time of the sender in the Tr field, which helps to identify any timing information that is very much deviating from the recent data. A node can discard any corrupt message in order to stop the propagation of incorrect timing information through the network.

Energy awareness and efficiency is handled by utilizing the fact that nodes with different residual energy (i.e., low, medium and high) may exist in a WSN at any time. However, low-energy nodes should not contest for the reference node. Moreover, when an active reference node becomes low in energy, it should retreat to an ordinary node, and the process for election of the reference node should take place again. The RTSP algorithm ensures that any node contesting for reference node has sufficient residual energy so that it can stay active for a long time, broadcast RTSP-ERN messages regularly, and actively reply to the queries forwarded to it. It will also save on the energy consumed by frequent re-elections of the reference node otherwise. However, when the reference node becomes low in residual energy, it retreats to an ordinary node, and the election process takes place again.

In RTSP, the frequency of broadcasts by the reference node is $1/10^{th}$ of the frequency in FTSP, which saves a huge amount of energy. Moreover, the adaptive nature of the algorithm reduces unnecessary time synchronization requests, and hence saves on energy. Note that once a node becomes synchronized, it can reply to time synchronization requests routed through it without any need to forward them to the reference node. This reduces the burden on the reference node and saves on energy by not forwarding the request all the way to the reference node.

The uncertainties in massage delivery include the following time delays: send, access, transmission, propagation, reception, receive, interrupt handling, encoding, decoding and byte alignment time. Although the RTSP algorithm uses a request-and-reply mechanism similar to TPSN, but in a recursive manner, it uses MAC-layer time-stamping of messages, similar to FTSP, that removes all the sources of uncertainties in message delivery delays, except the propagation delay. Therefore, we can follow the TPSN-like approach in order to analyse the errors of the RTSP algorithm.

Consider the request-and-reply mechanism of RTSP in FIG. 2, where node A sends a request at T1 to another node B that receives it at time T2 according to their local clocks. However, the real time, measured by an ideal clock at these nodes, is denoted by t1 and t2 respectively. The following equation was derived for TPSN:

$$t_2 = t_1 + S_A + P_{A \to B} + R_B \quad (8)$$

where $S_A$ is the time taken to send message (send+access+transmission time) at node A, $R_B$ is the time taken to receive the message (reception+receive time) at node B, and $P_{A \to B}$ is the propagation time between nodes A and B. Since the MAC-layer time-stamping of messages removes all the sources of uncertainties except the propagation delay, equation (8) can be written as follows for RTSP:

$$t_2 = t_1 + P_{A \to B} \quad (9)$$

The corresponding equation in terms of local clocks, which involves clock drifts as well, can be written as follows:

$$T_2 = T_1 + P_{A \to B} + D_{t1}^{A \to B} \quad (10)$$

Now, the relative drift between the two nodes from t1 to t4, i.e., $RD_{t1 \to t4}^{A \to B}$ is the A difference of their respective drifts, which can be positive or negative, depending on the value of the two drifts, and is given by the following equation:

$$RD_{t1 \to t4}^{A \to B} = D_{t1}^{A \to B} - D_{t4}^{A \to B} \quad (11)$$

From equation (11), we can get the value of $D_{t1}^{A \to B}$ and put it in equation (10) to get the following equation:

$$T_2 = T_1 + P_{A \to B} + D_{t4}^{A \to B} + RD_{t1 \to t4}^{A \to B} \quad (12)$$

After receiving the request message at time T2, node B forwards this request to another node in a recursive manner until it reaches the node N, which replies with timing information that is forwarded to node B through the same path. At time T3, node B forwards this reply to node A, which receives it at time T4, according to their local clocks. Using analysis similar to equation (10), the following equation can be derived:

$$T_4 = T_3 + P_{B \to A} + D_{t3}^{B \to A} \quad (13)$$

Note that $D_{t3}^{B \to A} \approx D_{t4}^{B \to A}$ and $D_{t4}^{B \to A} = -D_{t4}^{A \to B}$. Hence, equation (13) can be written as follows:

$$T_4 = T_3 + P_{B \to A} - D_{t4}^{A \to B} \quad (14)$$

Subtracting equation (14) from equation (12) gives the following equation:

$$T_2 - T_4 = T_1 + P_{A \to B} + D_{t4}^{A \to B} + RD_{t1 \to t4}^{A \to B} - T_3 - P_{B \to A} + D_{t4}^{A \to B} \quad (15)$$

Re-arranging equation (15), and substituting $(P_{A \to B} - P_{B \to A})$ with $P^{UC}$ gives equation (16), where $P^{UC}$ represents the uncertainty in propagation time:

$$(T_2 - T_1) - (T_4 - T_3) = P^{UC} + RD_{t1 \to t4}^{A \to B} + 2D_{t4}^{A \to B} \quad (16)$$

Since we know that the offset $$\Delta = \frac{(T_2 - T_1) - (T_4 - T_3)}{2},$$

therefore equation (16) can be written as follows:

$$2\Delta = P^{UC} + RD_{t1 \to t4}^{A \to B} + 2D_{t4}^{A \to B} \quad (17)$$

To correct the clock at T4 at node A, subtract the value of $D_{t4}^{A \to B}$ from $\Delta$, which results in the following equation:

$$\text{Error} = \Delta - D_{t4}^{A \to B} = \frac{P^{UC}}{2} + \frac{RD_{t1 \to t4}^{A \to B}}{2}. \quad (18)$$

From equation (18), we can conclude that the RTSP algorithm has only a Variation in Propagation Delays ($P^{UC}$) error and a Relative Drift Between Local Clocks ($RD_{t1 \to t4}^{A \to B}$) error. The RTSP algorithm assumes that the propagation delay in one direction is exactly equal to the other. When this is true, one source of synchronization error is eliminated, and accuracy of the time synchronization is improved further. However, this assumption may not be true in wireless communication. Consequently, each hop might add possibly an inaccurate value of d to the reference time Tr in order to find the new value of Tr. Fortunately, the variation in propagation delays can be neglected. Since propagation delay is calculated as distance between two nodes divided by the speed of the radio signal through air that is close to speed of light, the variation in propagation delays can be neglected because the change in two determining factors is negligible during the short interval between T1 and T4. For example, the maximum increase in distance between two nodes moving at the speed of 1000 km/h will be only 0.0006 m/μs. Similarly, the speed of a radio signal affected by changes in the air temperature and humidity is negligible for a distance of hundreds of miles, and totally negligible for the distance of a few hundred meters that is typical in WSNs. Therefore, we can conclude that the variation in propagation delays in WSNs is usually negligible.

The hardware clock in a low-cost sensor node is usually based on a quartz crystal oscillator that is vulnerable to huge drift from the ideal clock. However, equation (18) shows that the RTSP is sensitive only to the "relative drift" between the two clocks, instead of the drift from an ideal clock. It calculates the relative drift ($\beta$) and offset ($\alpha$) for equation (4) using least square linear regression on two data points (2LR), as in the following equations (19, 20), where $x_i$ is the global time, while $y_i$ is the local time:

$$\beta = \frac{x1 - x2}{y1 - y2} \quad (19)$$

$$\alpha = \bar{y} - \beta \bar{x} \quad (20)$$

The skew or drift between two clocks can be compensated using equations (4), (19) and (20). Consequently, the effect of this source of error is also minimized by the RTSP algorithm.

Regarding the propagation of errors in multi-hop, any error at one hop may increase when it propagates to the next hops. But in the case of time synchronization, the error may not always increase, due to the different sign and the magnitude of the drift rate of the sensors.

In a network of k hops, every hop may experience a random error of $\delta$. As the sum of randomly distributed errors is the square root of the sum of the squares of errors on each hop, the total error at the $k^{th}$ hop may be calculated as:

$$\text{Error}_{k\text{-}hop} = \sqrt{(\delta_1)^2 + (\delta_2)^2 + ... + (\delta_k)^2}, \quad (21)$$

which can be written in a simpler form as follows:

$$\text{Error}_{k\text{-}hop} = \delta\sqrt{k} \quad (22)$$

Therefore, the total error at the $k^{th}$ hop may be in the order of $\delta\sqrt{k}$, which means that the accuracy of time synchronization does not decrease much with the increase in the number of hops.

With respect to bounds on total error in multi-hop, according to equation (22), the total error at the $k^{th}$ hop may be in the order of $\delta\sqrt{k}$. However, due to the different sign and the magnitude of error at each hop, the errors may sum up to a much smaller value, which can be zero as well. Extreme situations occur when all the errors are either negative or positive. Accordingly, the total error at the $k^{th}$ hop is $-\delta\sqrt{k}$ for all negative values of $\delta$, while $+\delta\sqrt{k}$ for all positive values of $\delta$. This determines the bounds on total error in a multi-hop network as:

$$-\delta\sqrt{k} \leq \text{Error}_{k\text{-}hop} \leq +\delta\sqrt{k} \quad (23)$$

After the network starts up, RTSP can synchronise a node as soon as it receives two data points, which can be requested by a node as soon as it knows the ID of the reference node. Therefore, the setup time of RTSP is about 2T, compared to 8T for FTSP, where T is the fixed interval for re-synchronization in FTSP.

The time-stamping mechanism of RTSP is much simpler when compared to FTSP. Moreover, RTSP calculates skew and offset using 2LR, instead of the SLR used in FTSP. Accordingly, RTSP requires much lesser time to execute its steps, and lower memory to store the data points.

The RTSP algorithm consumes less energy, compared to FTSP. It saves energy through infrequent reference broadcasts, and by reducing the number of requests through the adaptive re-synchronization interval and request-aggregation.

A simulation was performed in MATLAB using the parameters given in Table 3. Note the use of random topology, the random walk mobility model, and the pause time of zero, which makes the network highly dynamic. A time synchronization protocol that performs better in such a network is expected to perform even batter in a static environment. The main steps of the simulation are as follows: (a) a class for sensor node is defined with different attributes, such as ID, position (x, y, z), energy level, level in hierarchy, parent ID, current time, offset ($\alpha$) and skew ($\beta$); (b) a set of network parameters are defined including the total number of nodes in the network, transmission range, deployment area, re-synchronization interval, mobility or pause time for each node, processing delay at each node, and number of simulation to run; (c) for the total number of nodes, instances of the sensor node class are created, and random values are generated for the position of each node; (d) communication links are defined according to the transmission range and distance between sensor nodes; (e) four instances of the above network are created for the four protocols to run; (f) network instances are customized for each protocol (for example, clusters are defined in the network instances for RBS and RTSP, and tree-like structure is defined in the network instances for TPSN and FTSP); (g) protocols are run on their own instance of the network for several times and results are stored in a workbook; and (h) incomplete results and outliers are filtered, and data is analysed for synchronization error and energy consumption.

TABLE 3

Simulation Parameters

| Parameter | Description |
| --- | --- |
| No. of nodes | 50, 100, 200, 500 |
| Prob. of becoming clusterhead | 5% |
| Topology | Random |
| Deployment area | 50 m x 50 m to 500 m x 500 m |
| Mobility | High (pause time 0) |
| Mobility model | Random Walk |
| Processing delay (at each node) | 1 ms-100 ms |
| No of simulations (results averaged) | 1000 |
| Channel | Wireless |
| MAC | IEEE 802.15.4/ZigBee |
| Antenna | Omni |
| Transmission range | 30 m |
| Routing protocol | AODV |

Simulation results showed that the average absolute error of the RTSP algorithm is 0.288 μs for a flat network and 0.230 μs for a clustered network, which is significantly lower than the FTSP protocol, which is 0.485 μs. However, the performance of RBS and TPSN is very bad compared to other algorithms. The average synchronization error of the RTSP algorithm for nodes at the 10$^{th}$ hop is 0.420 us for a flat network and 0.388 μs for a clustered network, which is even less than the average synchronization error of FTSP in a 1-hop network. In the beginning, total energy consumption (i.e., no. of messages exchanged) of the RTSP algorithm is higher than TPSN and FTSP. However, it becomes equal to TPSN after 4 or 5 periods and equal to FTSP after 7 or 8 periods, and then always remains lower than these two protocols in the long run. Using the Curve Fitting Toolbox in MATLAB, we found the regression equation for the RTSP curve, which revealed that each node sends only 0.2 messages for a flat network and 0.14 messages for a clustered network in the long run, which means that it consumes 5 to 7 times less energy than FTSP.

Energy consumption is a very important factor in the performance of time synchronization algorithms. However, actual energy consumption many be affected by many factors, such as type of the hardware, software, and antenna etc. Therefore, we measure energy consumption in terms of the total number of time synchronization messages exchanged among the nodes, while assuming the same type of hardware, software, and antenna etc. for all protocols. If the re-synchronization period is T seconds (based on FTSP) and N is the total number of nodes, then each node sends N messages in the RBS protocol, 2 messages in the TPSN protocol, 1 message in the FTSP protocol, and only 0.14 messages in the RTSP protocol in the long run.

It is to be understood that the present invention is not limited to the embodiments described above, but encompasses any and all embodiments within the scope of the following claims.

We claim:

1. A computer-implemented recursive time synchronization protocol method for a clustered wireless sensor network (WSN), comprising the steps of:
   electing a single reference node i for offset and drift compensation, the electing being limited to nodes that are clusterheads;
   calculating a time read by a logical clock of the i$^{th}$ node of the clustered WSN, the calculation utilizing the relation:

$$C_i(t)=\alpha_i+\beta_i t,$$

where $\alpha_i$ is the clock offset deviation from ideal time at the reference time t=0 and $\beta_i$ is the frequency of the clock;
   re-synchronizing the clock within a time T≤δ/2ρ, where δ is an offset and ρ is a skew rate;
   estimating the offset and a drift of the clock, thereby re-synchronizing the clock;
   initiating a time synchronization request, the time synchronization request being initiated by any initiating node in the clustered WSN, wherein the step of initiating the time synchronization request comprises the steps of:
      initiating the time synchronization request from the initiating node at the initiating node's local time T1 and transmitting the time synchronization request to a first intermediate node;
      receiving the time synchronization request at the first intermediate node at the first intermediate node's local time T2;
      storing identification data and local times T1 and T2 in computer readable memory, the local times T1 and T2 being respectively stored as variables T1 old and T2old; and
      forwarding the time synchronization request from the first intermediate node to a second intermediate node at the first intermediate nodes local time T1;
   recursively forwarding the time synchronization request from the second intermediate node to the reference node, thereby establishing a request-path, the reference node receiving the forwarded time synchronization request at the reference node's local time T2;
   using a REP (reply to time synchronization) message to forward the time T back to the initiating node via the request-path; and
   compensating the time T with a propagation delay time at each hop in the request-path, thereby time synchronizing all clustered WSN nodes in the request-path, wherein the step of compensating the time T comprises the steps of:
      transmitting the REP message from the reference node to the second intermediate node at the reference node's local time T3;
      receiving the REP message at the second intermediate node at the second intermediate node's local time T4;
      calculating a first propagation delay, d1, as $$d1 = \frac{(T2 - T1) + (T4 - T3)}{2};$$

updating the time T as T=T+d1;
      updating the time T by adding an elapsed time since the second intermediate node's local time T4 to T;
      forwarding the REP message from the second intermediate node to the first intermediate node at the first intermediate node's local time T3;
      calculating a second propagation delay, d2, as $$d2 = \frac{(T2 - T1) + (T4 - T3)}{2};$$

updating the time T as T=T+d2;
      updating the time T by adding an elapsed time since the first intermediate node's local time T3 to T; and
      recursively forwarding the REP message from the first intermediate node to the initiating node.

2. The computer-implemented recursive time synchronization protocol method for clustered wireless sensor networks according to claim 1, wherein said reference node election further comprises the step of sending an ERN (enquiry/reference node election) message directed at the clusterheads.

3. The computer-implemented recursive time synchronization protocol method for clustered wireless sensor networks according to claim 2, wherein said request for time synchronization (REQ) comprises the step of sending a REQ message directed at the reference node.

4. The computer-implemented recursive time synchronization protocol method for clustered wireless sensor networks according to claim 3, wherein said ERN, REP and REQ messages each comprise a message ID field, an origin ID field, an immediate source node ID field, an immediate destination node ID field, a reference node ID field, a local time when the message was sent/forwarded field, a local time when the message was received field, a local time when a reply was sent/forwarded field, and a reference time when the reply was sent/forwarded field.

5. The computer-implemented recursive time synchronization protocol method for clustered wireless sensor networks according to claim 3, wherein said step of time T forwarding is performed by any fully time synchronized node in said request-path.

6. The computer-implemented recursive time synchronization protocol method for clustered wireless sensor networks according to claim 5, wherein nodes within a predefined range to the reference node perform the following steps before nodes outside the predefined range:
receive announcements about a newly elected reference node;
initiate a time synchronization request on knowing the ID of the newly elected reference node; and
synchronize with the newly elected reference node.

7. The computer-implemented recursive time synchronization protocol method for clustered wireless sensor networks according to claim 6, further comprising the step of said newly elected reference node to retreat on receiving an ERN message from another reference node having a smaller identification (ID), thereby avoiding a reference node conflict.

8. The computer-implemented recursive time synchronization protocol method for clustered wireless sensor networks according to claim 7, further comprising the steps of:
using said ERN message to determine if a node is losing accuracy of time synchronization; and
recursively performing said step of forwarding the time synchronization request when the node is determined to be losing time synchronization accuracy.

9. The computer-implemented recursive time synchronization protocol method for clustered wireless sensor networks according to claim 7, wherein said step of estimating the offset and the drift of the clock is performed using a least square linear regression on two data points (2LR), governed by the relations:

$$\beta = \frac{x1 - x2}{y1 - y2} \text{ and}$$

$$\alpha = \bar{y} - \beta\bar{x},$$

where $x_i$ is the global time, $y_i$ is the local time, $\bar{x}$ is a mean global time of the two data points, and $\bar{y}$ is a mean local time of the two data points.

* * * * *